W. E. HAMILTON.
MINING SYSTEM.
APPLICATION FILED AUG. 30, 1909. RENEWED SEPT. 29, 1916.
1,244,601.
Patented Oct. 30, 1917.
8 SHEETS—SHEET 1.
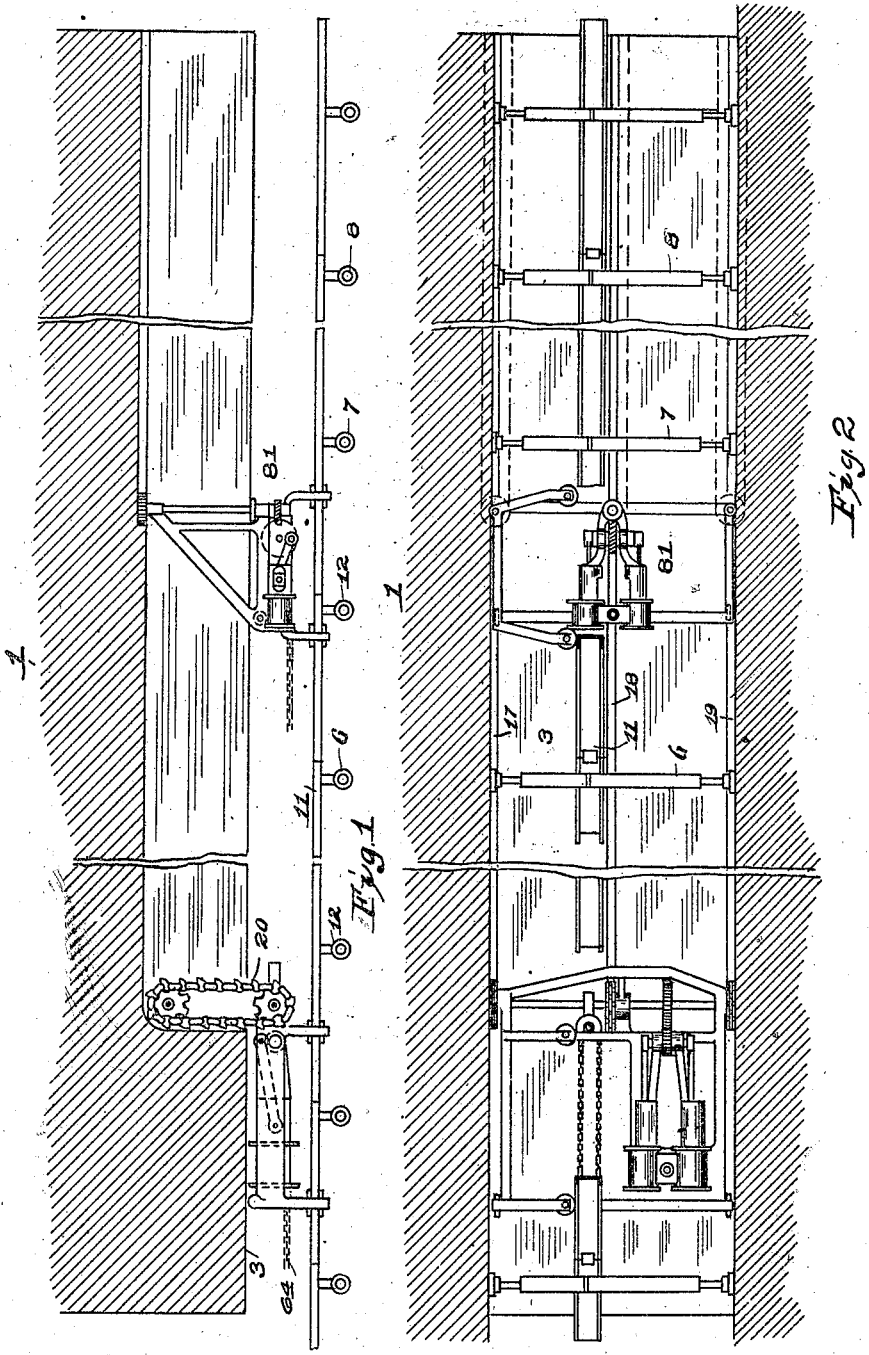
WITNESSES:
INVENTOR
William E. Hamilton
BY
Geo. W. Rightmire
ATTORNEY.

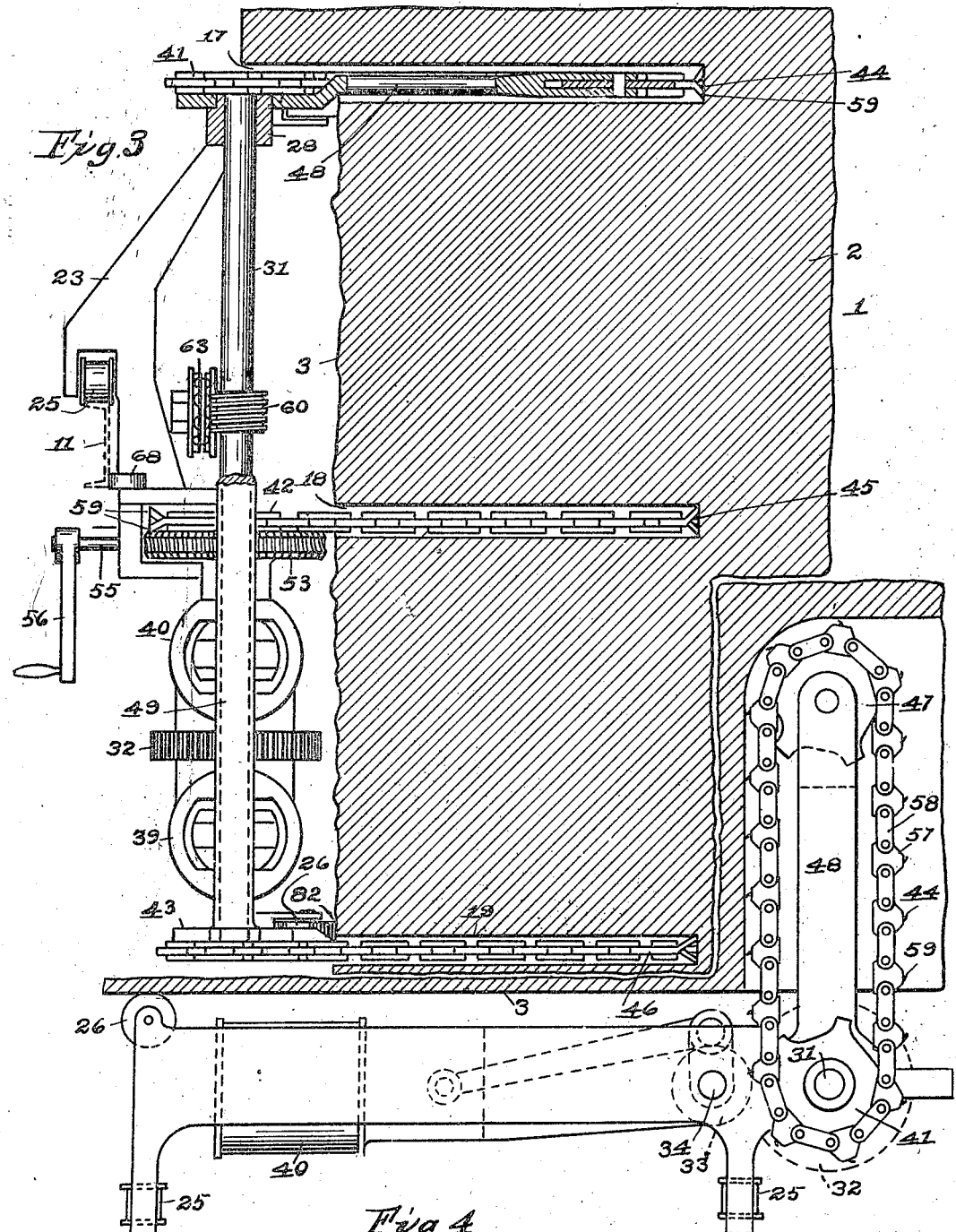

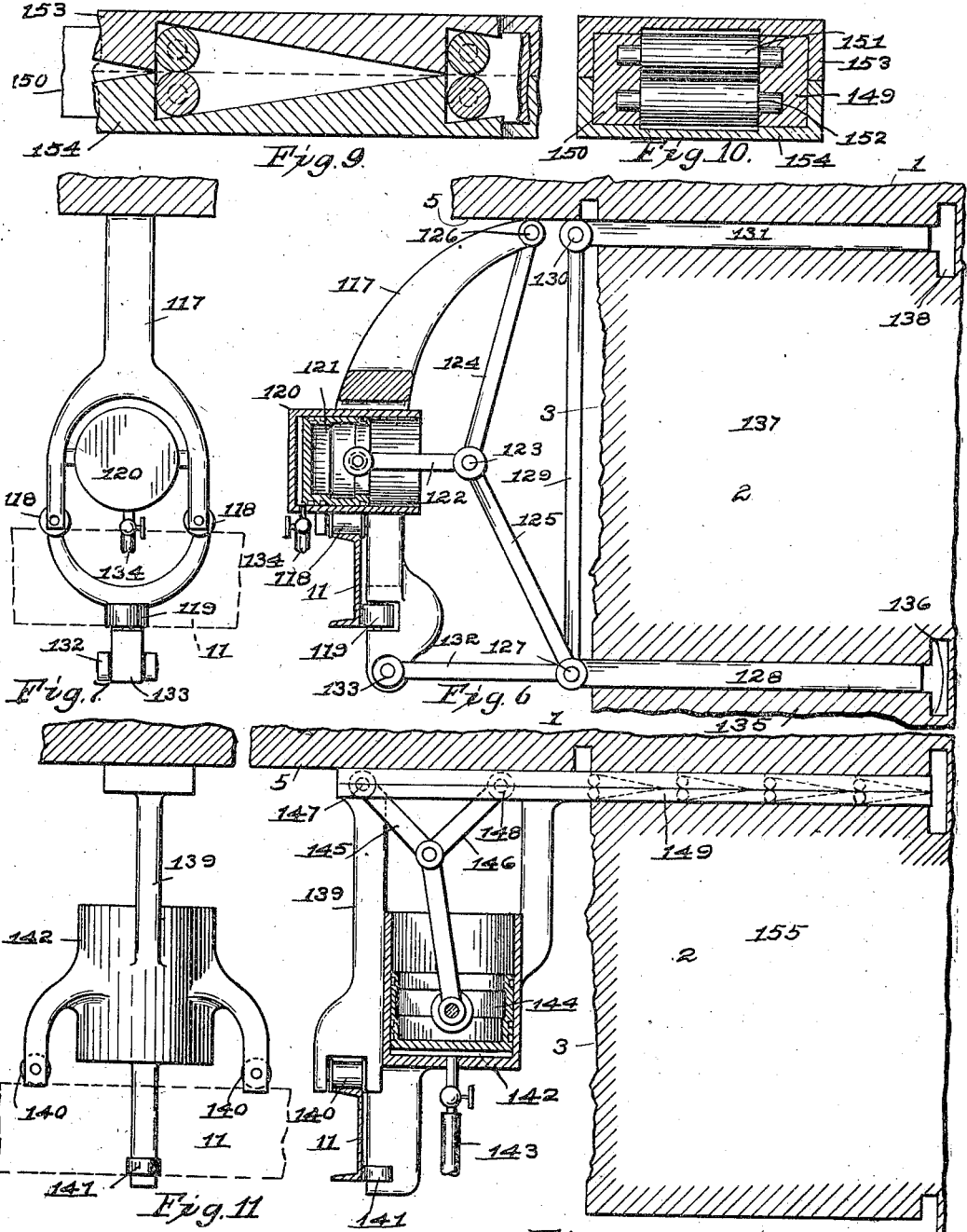

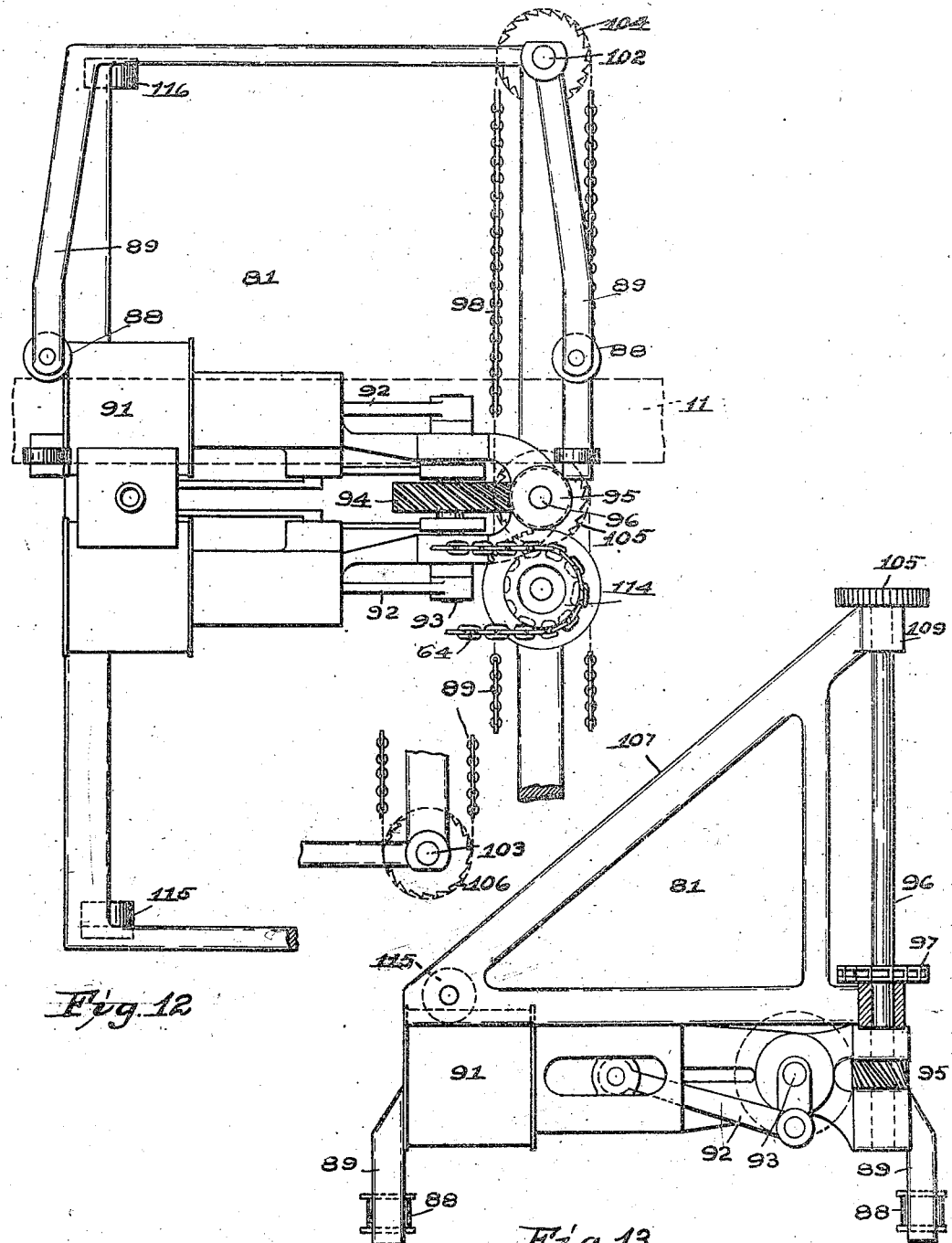

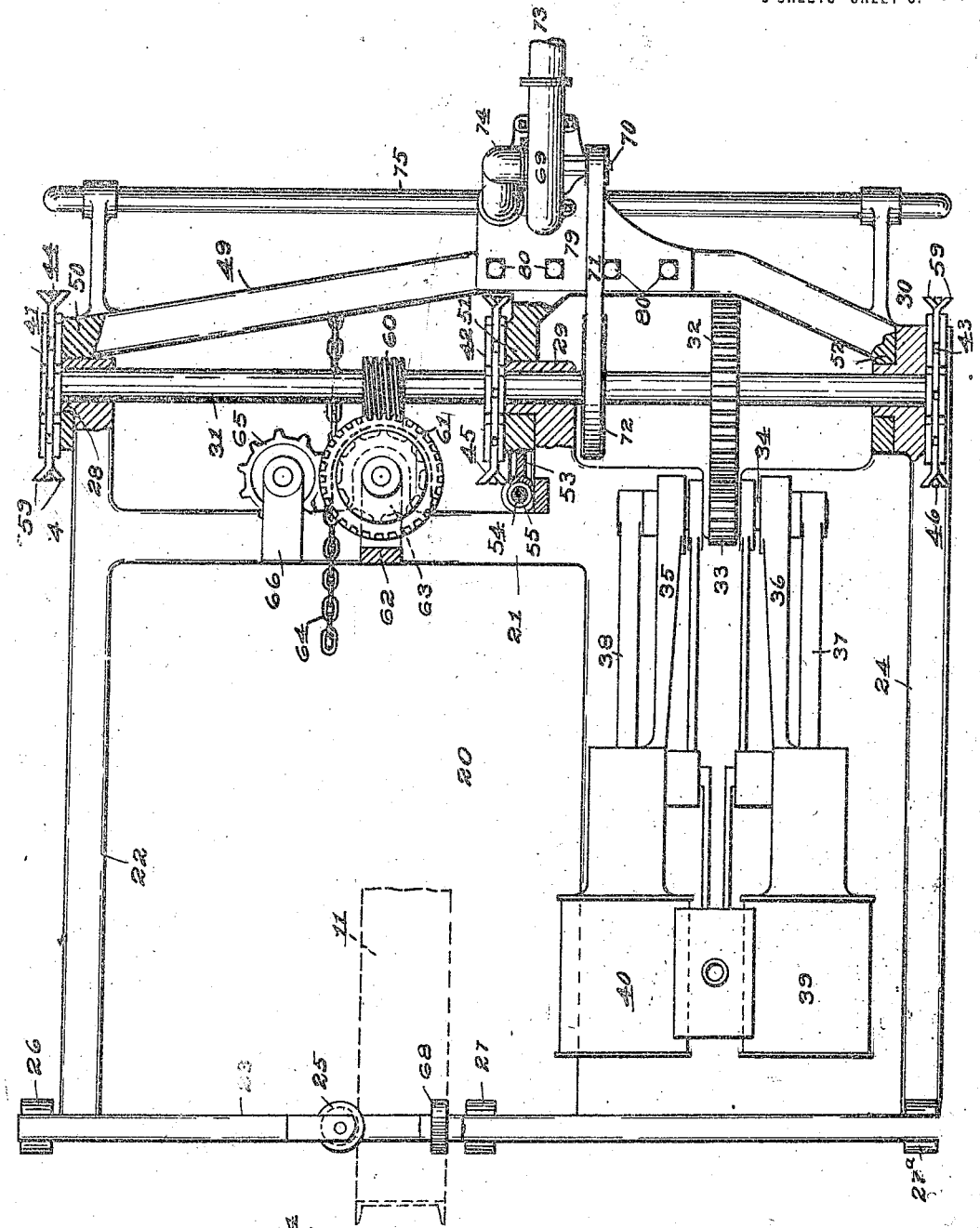

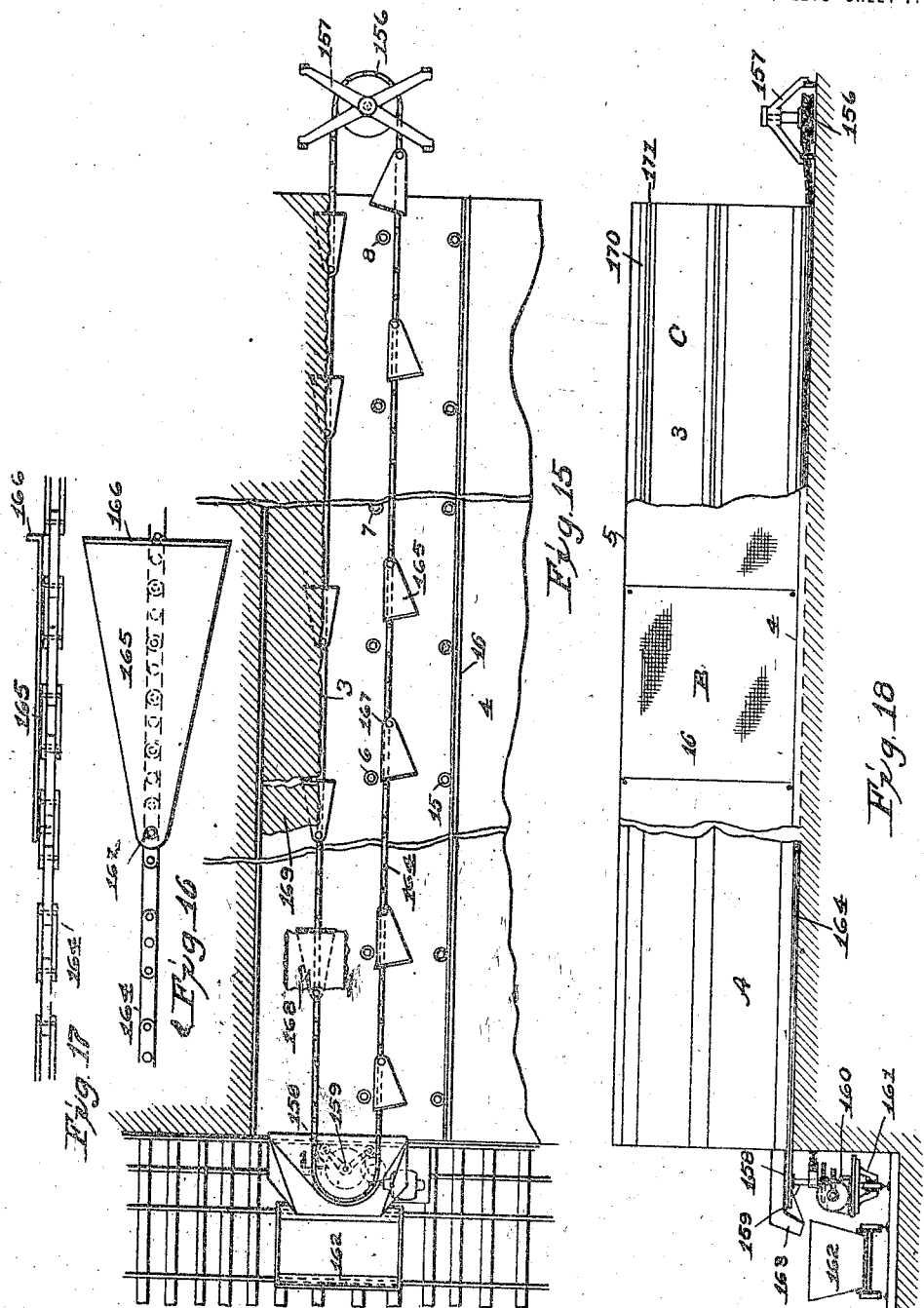

W. E. HAMILTON.
MINING SYSTEM.
APPLICATION FILED AUG. 30, 1909. RENEWED SEPT. 29, 1916.
1,244,601.
Patented Oct. 30, 1917.
8 SHEETS—SHEET 8.
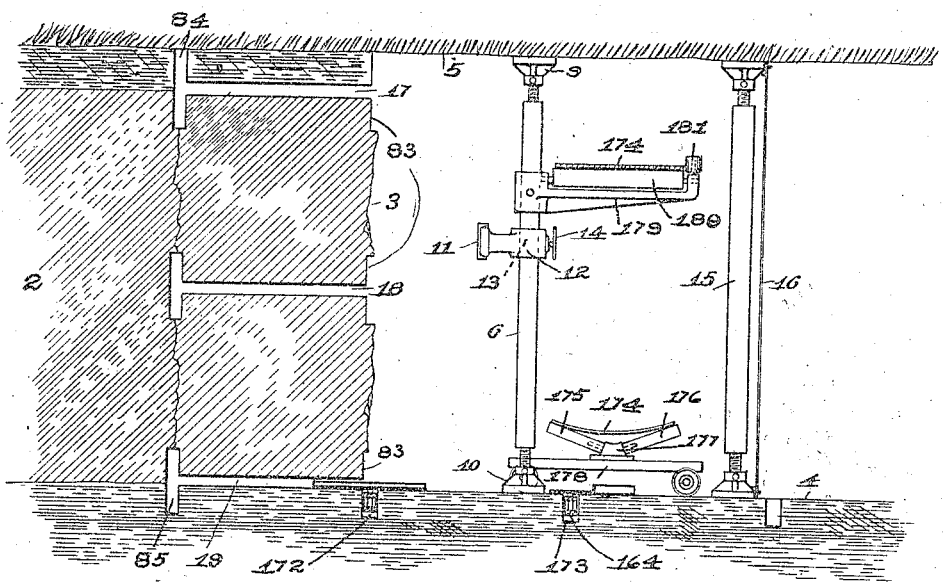
Fig. 19
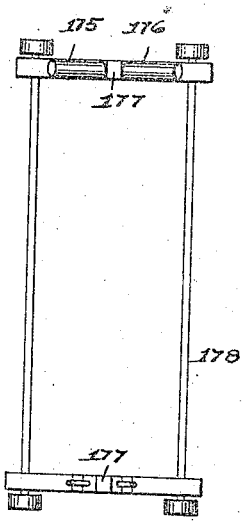
Fig. 20
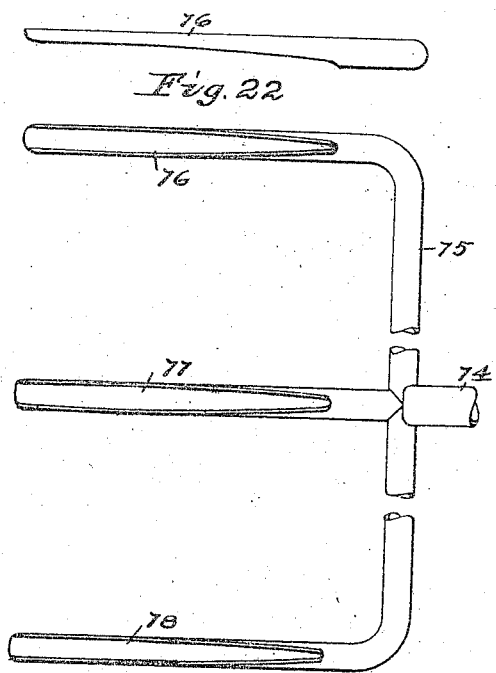
Fig. 22
Fig. 21
Witnesses
Inventor
William E. Hamilton
By his Attorney

UNITED STATES PATENT OFFICE.

WILLIAM E. HAMILTON, OF COLUMBUS, OHIO, ASSIGNOR TO THE JEFFREY MANUFACTURING COMPANY, OF COLUMBUS, OHIO, A CORPORATION OF OHIO.

MINING SYSTEM.

1,244,601. Specification of Letters Patent. Patented Oct. 30, 1917.

Application filed August 30, 1909, Serial No. 515,341. Renewed September 29, 1916. Serial No. 122,929.

*To all whom it may concern:*

Be it known that I, WILLIAM E. HAMILTON, a citizen of the United States, residing at Columbus, in the county of Franklin and State of Ohio, have invented certain new and useful Improvements in Mining Systems, of which the following is a specification.

My invention relates to improvements in coal mining systems, and has for its principal objects and features the following:

It is an improvement over the present systems of coal mining, especially in that it recovers all of the coal, and does so chiefly in large lump form; it renders possible much better ventilation by avoiding the old room and pillar arrangement; it obviates the use of expolsives and consequently the danger resulting therefrom in the falling of fractured portions of the roof or the coal body; it also makes it possible to remove strata of foreign matter which are frequently found extending longitudinally with the coal formation and embedded therein; it also carries away the dust incident to the cutting of the coal and prevents it from becoming obnoxious to the operators.

To accomplish these purposes thus generally outlined I contemplate the use of a system comprising a plurality of machines or devices which would properly operate in the following order of sequence, to-wit:

(1). A cutting or channeling machine adapted to form one or more horizontal slots or channels longitudinally of the face of the coal, extending inwardly to the depth desired;

(2). A machine or device adapted to form a continuous vertical slot along the inner end of the horizontal channels for a purpose to be noted;

(3). A third machine or device adapted to break down the coal thus channeled in large lumps;

(4). A machine or device adapted to gather the coal thus dislodged and convey the same to a loading point. These constitute the essential features of my system and I contemplate the provision of a series of supporting posts provided with a track or guide-way which acts as a support and a guide for the several machines above mentioned; this series of posts also supports the roof and thereby affords protection to the workmen engaged in the business of mining the coal. Preferably also the series of posts is arranged so as to be moved inwardly as the work of mining and removing the coal progresses. This may be accomplished in several ways which will be hereinafter set forth. Further I provide a dust extractor in connection with the cutting and slotting machines, and an appropriate air chamber is formed by arranging a curtain at some distance from the working face of the coal which may be moved as the working progresses.

Reference is made to the accompanying drawings in which—

Figure 1 shows a plan view of two of the series of the machines in operating position;

Fig. 2 is an elevation of the machines shown in Fig. 1 with their supporting construction;

Fig. 3 is a vertical transverse section through the body of the coal showing the cutting machine in position, partly in section;

Fig. 4 shows a cutter chain mounted for operation and a conventional source of power;

Fig. 6 is a view of one form of breaking device, being essentially a penumatic toggle lever construction;

Fig. 7 is an end view of the construction shown in Fig. 6;

Fig. 8 is a view of an alternative form of breaking device in which an expansion wedge is used to accomplish the breaking.

Fig. 9 is an enlarged view in longitudinal section of the wedge construction shown in Fig. 8;

Fig. 10 is a view in transverse section of the wedge construction shown in Fig. 8;

Fig. 11 is an end elevation of the construction shown in Fig. 8;

Fig. 12 is a view of the slotting machine shown in Fig. 5 disclosing especially the actuating means and the means of supporting the machine;

Fig. 13 is a top view of one of the slotting devices, partly in section, showing the source of power for actuating the same and the bracket supporting construction for the slotting device.

Fig. 14 is a front elevation of the cutting device showing the means for mounting and actuating the same and also the construction for swinging the same into and out of cutting position; it also shows the dust extracting device in combination with one of the machines used in my system;

Fig. 15 is a view showing the conveying means;

Fig. 16 is an enlarged view of the gathering or conveyer member;

Fig. 17 is a side view of the conveyer chain and conveyer member;

Fig. 18 is a side elevation of the face of the long wall showing at A a portion of the wall from which a cut of coal has been removed, at B a curtain behind which the breaking machine is at work, and at C a portion of the wall which has been cut and slotted ready for the operation of the breaking machine;

Fig. 19 shows two conveyer systems in a transverse section of the mine;

Fig. 20 is an upper plan view of the conveyer supporting the truck shown in Fig. 19;

Fig. 21 is a side view of the dust extractor or collecting tubes;

Fig. 22 is a plan of one of the collecting tubes shown in Fig. 21.

Figure 5:
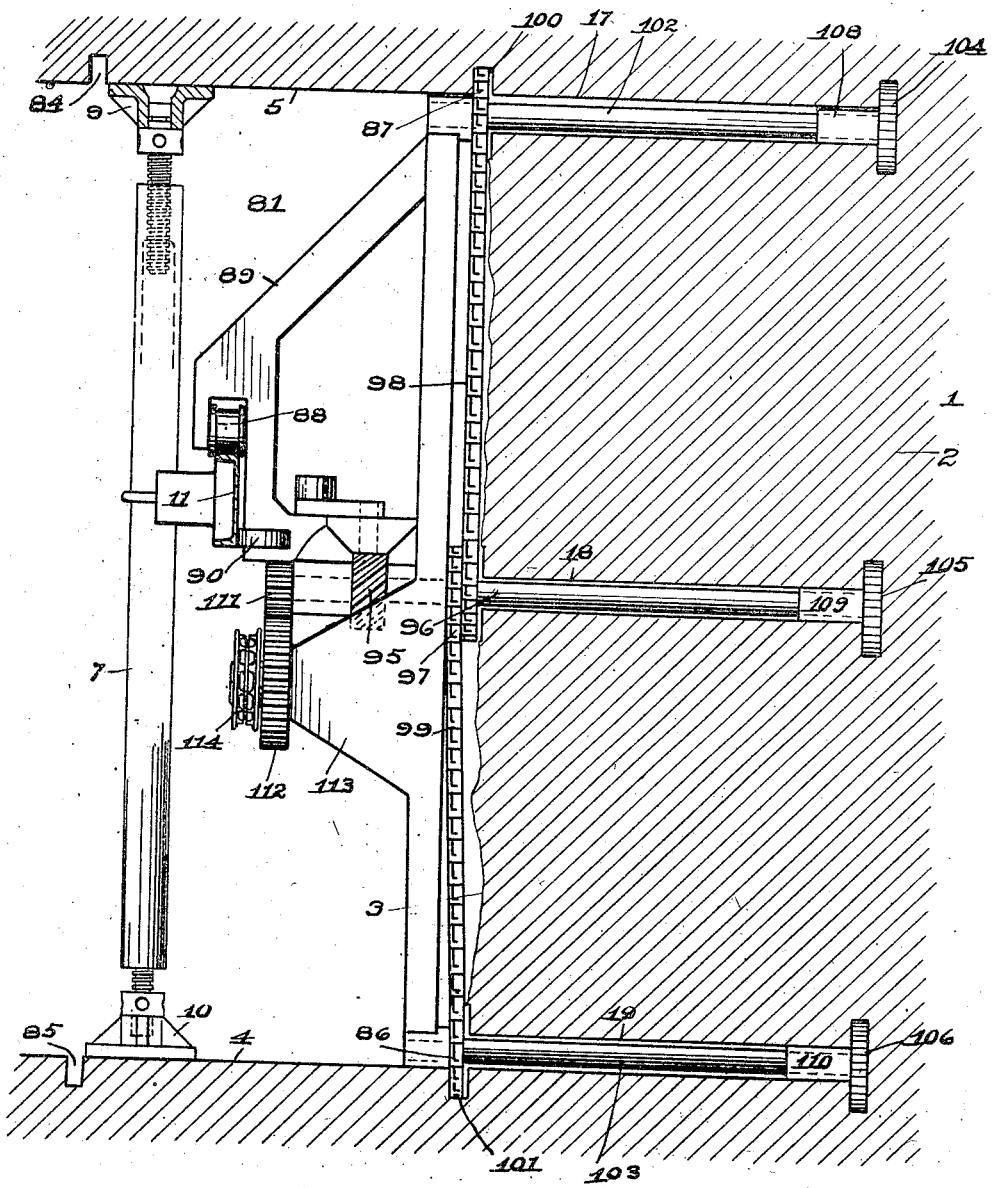
Fig. 5 is a vertical transverse section through the body of the coal showing the vertical slotting machine in position and the means of supporting and guiding the same.

In the drawings, the body of coal upon which my mining and conveying system is adapted to operate is shown at 1, a transverse section therethrough being shown at 2, the working face thereof being shown at 3. The floor of the mine is shown at 4 and the roof is indicated at 5. Parallel with the working face of the wall is established a series or row of posts indicated at 6, 7 and 8 and at other points, which are secured in position by providing at the upper and lower ends thereof threaded members 9 and 10, which are adapted to be turned into snug contact with the roof and floor respectively. The purpose of this series of posts is to support the track or guideway 11 and this is accomplished by providing a bracket member 12 containing the opening 13 therethrough to receive the body of the post and having the set-screw or hand-wheel-operated screw 14 thereon to engage the post when the bracket member 12 has been positioned as desired. It is seen that the bracket member 12 is capable of being moved upwardly or downwardly on the post and in this manner the height of the track 11 can be determined at will. The track consists essentially of a channel member appropriately mounted on the bracket member 12 as appears clearly in Fig. 19. On account of the manner of engaging the posts with the roof and floor of the mine, the post is easily moved from place to place and when a cut of coal has been removed as hereinafter described the series of posts will be moved inwardly to a new position in parallel with the new face of the coal to be operated upon. A purpose of the posts is also to support a conveying system hereinafter described.

I also provide a second and outer row of posts, one of which is shown in Fig. 19 at 15; this post is constructed similar to the series of posts above described and is movable in the same manner and is extended to support properly secured thereon a curtain member 16. The purpose of the curtain is to form a wall at a distance from the working face of the coal, thereby providing a passageway through the mine through which pure air is circulated.

The system of machines hereinafter described is each preferably mounted on a track or guideway 11 and is movable thereon longitudinally in either direction along the face of the coal wall operated upon, and after the coal dislodged by the system of machines is conveyed away, the machines remain on the trackway; the track is preferably formed of appropriate sections secured together in any desired manner and the machines thereon are moved inwardly along with the posts to the new operating position. This movement may be effected in any preferred manner, a number of ways being capable of use in this connection.

The first operation necessary when coal is to be mined in the long wall system is to make a number of parallel channels or slots therein preferably in horizontal planes and in the drawings herein I have illustrated a coal measure which is being mined by forming therein three such channels or slots indicated at 17, 18 and 19; these channels are formed by means of the cutting machine shown in Fig. 1 generally at 20 and in greater detail in Figs. 3 and 4, the operating mechanism being shown especially in Fig. 14. This cutting machine comprises the frame shown generally at 21, 22, 23 and 24 having the roller 25 secured thereon to engage the upper flange of the channel trackway 11, whereupon it is free to travel in either direction. The rollers 26, 27 and 27ª engage the recess formed in the face of the coal measure by the slotting operation hereinafter described and thereby keep the cutting machine 20 properly alined along the face of the wall. The members 21, 22, and 24 have formed thereon respectively the hubs 28, 29, and 30 in which is rotatably mounted the vertical shaft 31, carrying the gear 32, with which meshes the pinion 33 carried on the crank shaft 34 journaled in the arms 35 and 36, and actuated by the reciprocating connecting rods 37 and 38, driven by the motors 39 and 40. The motors are conveniently mounted on the frame-work, but it is not deemed essential to show in detail the manner of the mounting.

The shaft 31 carries the sprocket wheel 41 at its upper end, 42 at its middle point, and 43 at its lower end, and each sprocket wheel drives a cutting chain, the chains being shown at 44, 45 and 46. The inner end of each sprocket chain is carried by a sprocket wheel 47 mounted upon the inner end of an arm 48, the three arms being mounted upon a frame member 49, journaled on the hubs 28, 29 and 30 as seen at 50, 51 and 52. As shown especially in Figs. 3 and 14, the arm 51 carried by the frame 49 has at its outer end a worm gear 53, with which the worm 54 meshes, the latter being formed on the shaft 55 operated through the crank 56. In this manner when the crank is turned, the frame 49 carrying the arms is rotated, and thereby the arms with their cutting chains are positioned for cutting or swung out from the coal as desired. In Fig. 4, is shown a plan view of a cutting chain 44 in which it is seen that a series of blade bearing members 57 are connected by links 58, and the blades 59 are preferably staggered as appears in Fig. 3, whereby the proper width can be given to the slot or channel formed in the coal.

Shaft 31 carries thereon the worm 60 adapted to mesh with the worm gear 61 which is mounted at 62 on the frame member 21. On the same shaft, or, if preferred, formed integral with the worm gear, is a sheave 63 over which the traction chain 64 passes. A second sheave member 65 is mounted at 66 on the frame 21, and the traction chain 64 passing between the sheaves is engaged thereby as the sheaves are operated through the worm 60 and the worm gear 61. The effect of this construction is to cause the cutting frame to be moved forward as rapidly as the cutting operation can take place, the end of the chain 64 being anchored by the stake 67, located appropriately in the mine. The opposite end of the chain 64 may be connected with the slotting machine, to exercise traction thereon, and similarly the chain may be extended to the breaking machine, if desired, and in this manner the whole system of machines may move together, or they may, if preferred, be operated independently, but in sequence.

The frame member 23 also carries thereon the roller 68 which is adapted to engage with the channel trackway 11, and thereby aids in alining the cutting machine as it progresses in its work.

The depths of the slots or channels 17, 18 and 19 formed by the cutting machine in one passage through the mine is determined by the length of the supporting arms 48, and the width of the channel or slot is determined by the degree of staggering given to the cutting blades 59. It is readily seen that more than three cutting chains may be provided on a single shaft if desired, but ordinarily a channel at the top and one at the bottom, with an intermediate channel, makes the breaking down as easy as this operation can be made. One purpose of this system of mining is to obtain the coal in large lumps which renders it more marketable, and I arrange the cutting chains appropriately to form lumps that are not too thick to be readily handled.

The dust arising in the cutting operation is objectionable for several reasons and I have provided a dust extractor which is shown in Figs. 14, 21 and 22, comprising especially an inclosed fan 69 mounted on the shaft 70, rotated by the belt or chain 71, driven by the pulley 72 on the shaft 31. The fan casing is provided with a discharge opening 73, and into the fan casing leads a pipe 74, opening into the pipe 75, which carries thereon the dust gathering blades 76, 77 and 78. The pipe 75 and the fan casings are mounted on the frame 79, which is secured as shown at 80 through the swinging frame 49, and it therefore is swung inwardly and outwardly with the cutting chain above described. Therefore the dust gathering blades or tubes inserted in the slot or channel made by the cutting machine follow the cutter and are always in position to convey away the dust formed by the cutting operation. The discharge 73 is connected with an appropriate box or receptacle.

A second machine in the series constituting my improved mining and conveying system is the slotting machine shown in Fig. 1, generally at 81; the function of this machine is to form a vertical slot at the inner end of the channel formed by the cutting machine 20. The purpose of this slot is to render it easier to break down the body of the coal between two of the parallel slots formed by the cutting machine, and also to provide a smooth bearing surface for contact with the rollers 26, 27, and 28, as appears especially in Fig. 19 at 83. The slot 84 formed in the roof and 85 formed in the floor also answer the purpose of accommodating the drive or sprocket wheels 86 and 87 (Fig. 5) of the slotting machine, after the coal has been broken down and the slotting machine is engaged in operating on a subsequent cutting. Referring especially to Fig. 5, the roller 88 is adapted to travel on the trackway 11, the roller being carried in the frame 89, and the roller 90 is adapted to engage and bear against the side of the trackway 11 to aline and steady the slotting machine.

The motor 91 (Fig. 13) has the reciprocating connecting rod 92 actuating the crank shaft 93 upon which is mounted a spiral gear 94 adapted to mesh with the spiral gear 95 mounted on the cutter shaft 96, which has the double sprocket wheel 97 thereon. Over this wheel pass two link belts or chains 98 and 99 leading respectively to the sprocket wheels 100 and 101 mounted respectively upon the shafts 102 and 103. At the inner ends of the shafts 96, 102 and 103 are mounted the rotary cutters 104, 105, 106, the shaft with its cutter being supported by the arms, one of which is shown in Fig. 13 at 107, which lies within the horizontal channel or slot in which its supported shaft is operating, the shaft having a bearing in the inner end of the arm as shown at 108, 109, 110.

Mounted upon the outer end of the shaft 96 is the pinion 111 adapted to mesh with the gear 112 mounted appropriately upon the frame 113. Carried on the gear is the sheave 114 over which the chain 64 takes, and thereby this machine is moved along through the connection of the chain with the stake 67. As the slotting machine moves along the face of the wall the rollers 115, 116 bear against the face and assist in the alinement of the machine.

After the slotting machine has accomplished its function in preparing the coal for being broken down, and providing guideways for the various machines in their next passage over the face of the wall, I introduce the breaking machine shown partly in Figs. 6, 7, 8, 9, 10, and 11, two designs being therein shown. Referring to Figs. 6 and 7, one form of breaking machine is shown with its frame at 117 having rollers 118 thereon mounted on the trackway 11, and a second roller 119 thereon to engage the side of the trackway and assist in the alinement and support of the machine. In this frame 117 is carried a compressed air cylinder 120 in which the piston 121 is mounted, having pivotally connected therewith the link or piston rod 122 which at its outer end 123 connects with the toggle members 124 and 125, the former being pivotally mounted in the frame 117 at 126. Toggle member 125 is pivotally connected at its lower end 127 with a breaking lever 128 and a link 129, which is pivotally connected at 130 with the breaking lever 131. Arm 132 is pivotally associated at 127 with the members 125, 128, 129, and is mounted at its other end on the frame 117 at 133. The pipe 134 admits compressed air into the cylinder 120 to straighten the toggle arms 124 and 125, and the former being fixed at its upper end, the effect of the action of the compressed air is to push downwardly the outer end of the breaking lever 131. The lower block of coal 135 being undercut will tend to break away in the slot 136, while the block of coal 137 will tend to break away in the slot 138. Sufficient power being exerted, it is seen that the coal will be broken downwardly, and as the machine is moved along the track 11, the breaking effect is produced at successive points, the final effect being to break down all the coal that has been channeled and slotted.

Appropriate means for moving the breaking machine may be provided, it being necessary only that the machine be intermittently moved forward, remaining at one point only long enough to effect the breakage of the coal in that region.

One form of breaking device is shown in Fig. 8, different views thereof appearing in Figs. 9, 10 and 11. Referring to Fig. 8, the frame 139 is seen mounted on the roller 140 on the trackway 11, and the frame also carries the roller 141 which engages or bears against the side of the trackway 11 to assist in alining and steadying the machine. A compressed air chamber 142 has opening thereinto the supply pipe 143, and in the chamber appropriately mounted is the piston rod 144 which is connected to the toggle levers 145 and 146, the former being pivoted to the frame 139 at 147 and the latter being pivoted at 148 to the side members 149 and 150. Pivotally mounted in said side members are pairs of rollers 151 and 152, confined within a triangular box-like structure having the upper member 153 and the lower member 154, and as the rollers are moved forward by the expansion of the toggle arms 145, 146, they separate the members 153 and 154 vertically, thereby setting up a stress tending to break down the body of coal beneath, shown generally at 155. A number of these rollers is provided, and in the construction shown in Fig. 8, 4 pairs are shown, thereby distributing the breaking stress over the top face of the block 155 and tending to break the same uniformly. The arm 146 may be bifurcated to engage the side members 149, 150, if desired. An end view of the breaking machine shown in Fig. 6 appears in Fig. 7.

The next step in the process of mining and removing coal is the conveying away of the coal that has been cut and dislodged by the machines above described; the conveying means is shown in Figs. 15, 18, and 19 especially, and referring to Fig. 15, which is a top plan view, a large sprocket wheel 156 is mounted in the frame 157 which is appropriately anchored, and at the opposite end of the wall the sprocket wheel 158 is mounted on the shaft 159 which is driven generally by the mechanism shown at 160 on the platform 161. A car or other receptacle is shown at 162, into which the coal is discharged through the spout 163. The conveyer chain 164 formed of links as shown in Fig. 17 passes over said sprocket wheels. At intervals thereon are carrier members 165 having the upturned flange 166 thereon, one such member being shown enlarged in Fig. 16. The member is pivoted at 167, thereby being rendered free to swing out of the way of the posts shown in Fig. 15 and freely passing around the sprocket wheels at 156 and 158. The action of the conveyer chain 164 and the carrying members 165 thereon, is shown especially in Fig. 15 in which one of the carrying members is seen to be moving a detached block 168, while another is detaching the block 169.

The process of the breaking and removing is conventionally shown in Fig. 18 in which the conveyer 164 has already removed the coal which has been cut away leaving the face A. Here are clearly shown the upper, lower and middle slots made by the slotting machine and described above. In the portion of Fig. 18 marked B, there is shown a section of the curtain 16, the relative position of which is more clearly shown in Fig. 19, behind which the breaking machine is assumed to be at work. In the portion marked C at 170 is shown the upper portion of the slot made by the passage of the slotting machine on a previous trip, and at 171 is shown the slot or channel made by the cutting machine on its last trip. Therefore this region of the coal face is ready for the operation of the breaking machine. The portions A, B, and C, represent the conditions appearing in the three broken-apart regions in Fig. 15, the coal having all been removed from the end A, the removal now taking place from B and the breaking down not yet having been effected in portion C.

Referring to Fig. 19, the conveying system shown in Fig. 15 appears traveling in the slots 172 and 173, the additional function of the lower slot being herein shown. As above pointed out, the lower slot accommodates the lower sprocket wheel on the slotting machine and cutting machine, and herein it is seen that it also accommodates the conveyer construction above described. Moreover, in Fig. 19, I show an alternative form of conveyer comprising the belt 174 mounted on the roller arms 175, 176 having their bearings in frame 177 in the truck 178, which is shown in the upper plan view in Fig. 20. The roller arms 175 and 176 are inclined, being higher at their outer ends, to receive between them the belt 174 which is laden with coal, the coal being placed thereon preferably by hand. The truck 178 is constructed to be moved toward the body of the coal which is being worked. On the post 6 is mounted rotatably the bracket 178 having the roller 180 thereon over which the belt 174 moves, the latter being kept in proper position by the idler 181. The portion of the belt mounted on the truck 178 carries the coal, while the upper portion mounted on the roller 180 is the return portion. I have illustrated the belt only in vertical section, it being well understood how the belt would normally operate and how it would be mounted at its ends, and how the discharge therefrom may be effected.

Both systems of conveying may be installed and in use at the same time, the chain and carrier system being employed for the purpose of removing the large lumps and the broken portions of coal may be shoveled on the conveyer belt 174 and carried away in that manner. The moving of the belt conveyer system inwardly toward the working face of the coal is accomplished at the same time that the suspending trackway for the cutting, slotting and breaking machines is removed, the only additional operation being the moving of the trucks 178, which is readily accomplished, and which, when located properly, may be secured in place as desired.

Either system of conveying may be used separately, if desired, and when the chain and carrier system is employed, it may be moved forwardly under a succeeding cut of coal by means of the supporting frames at the ends, which are seen to be mounted on wheels.

The slotting machine herein described is not indispensable, as the mining and removing of the coal may proceed by the use of the other devices described; however, it exercises a beneficial function and its use would ordinarily increase the efficiency of the system.

The various machines and devices hereinbefore described are for use in carrying out my method of mining coal where it may be done with the so-called long wall, and the chief features of my method are seen to be the provision of a track way movable upon posts which also support the roof in the worked portion of the mine, the channeling, slotting, and breaking down of the coal by appropriate machinery, the provision of a conveyer onto which the coal may be directly broken down, or it may be shoveled thereon, the provision of dust-removing appliances, and also the provision of a room formed by curtaining in which the operations may be carried on.

I do not desire to be limited to the construction which I have herein illustrated and described, as variations thereof may be made to accomplish the same purpose in substantially the same manner. I limit myself therefore only as appears in the appended claims.

The claims herein relate to the system of mining, which I have described. I have heretofore filed another application, Serial No. 776,864 (filed July 1, 1913), and reserve the right to present therein claims relating to the apparatus herein shown and described, as one of the forms of apparatus which can be utilized to carry on the present system.

What I claim is:

1. The herein described method of mining coal which consists in cutting a horizontal kerf under the body of the coal and extending into the face thereof cutting a vertical slot in the floor formed, said slot extending along approximately parallel to the face of the coal, breaking down the overlying coal, transporting the broken coal away from the face by a continuously operating means traveling within the said kerf and guided by the said slot.

2. The herein described method of mining coal and removing it from its natural bed, which consists in forming a free working face on the said bed and in then performing repeatedly the following series of operations: forming two vertically separated horizontal kerfs extending lengthwise of the working face whereby there is provided an outward extending ledge of coal attached only at its inner side, forming by a single operation upward and downward extending vertical slots at the inner boundary of the lower kerf, the upper of the said slots serving to partly separate the said ledge from the main coal bed, causing a conveying means to travel parallelly with the working face and to be guided by the downward extending slot formed in the preceding series of operations, breaking down successive parts of the said ledge beginning at the free end face and continuing back therefrom, and transporting the coal by the said conveying means parallelly with the working face.

3. The herein described method of mining coal and removing it from its natural bed, which consists in forming a free working face on the said bed and a free end face at an angle to the working face and in then performing repeatedly the following series of operations: forming two vertically separated horizontal kerfs extending lengthwise of the working face whereby there is provided an outward extending ledge of coal attached only at its inner side, forming by a single operation upward and downward extending vertical slots at the inner boundary of the lower kerf, the upper of the said slots serving to partly separate the said ledge from the main coal bed, causing a conveying means to travel partly within the lower kerf parallelly with the working face and to be guided by the downward extending slot formed in the preceding series of operations, breaking down successive parts of the said ledge beginning at the free end face and continuing back therefrom, and transporting the coal by the said conveying means parallelly with the working face to the said end face and there transporting it at an angle to the working face.

In testimony whereof I affix my signature in the presence of two witnesses.

WILLIAM E. HAMILTON.

Witnesses:
  A. RAGER,
  HORACE S. KERR.